(12) United States Patent
Spatafora

(10) Patent No.: US 6,698,158 B2
(45) Date of Patent: Mar. 2, 2004

(54) MACHINE FOR PRODUCING PACKETS OF CIGARETTES, WHEREIN THE NUMBER OF MEMBERS OF EACH CONVEYOR IS COORDINATED WITH THE NUMBER OF MEMBERS OF THE ADJACENT CONVEYORS

(75) Inventor: Mario Spatafora, Bologna (IT)

(73) Assignee: G.D Societa' per Azinoi, Bologna (IT)

( * ) Notice: Subject to any disclaimer, the term of this patent is extended or adjusted under 35 U.S.C. 154(b) by 95 days.

(21) Appl. No.: 09/825,597

(22) Filed: Apr. 4, 2001

(65) Prior Publication Data

US 2001/0052217 A1 Dec. 20, 2001

(30) Foreign Application Priority Data

Apr. 4, 2000 (IT) .................................... BO2000A0185

(51) Int. Cl.⁷ ........................... B65B 19/22; B65B 57/00
(52) U.S. Cl. ............................... 53/77; 53/151; 53/234; 700/9
(58) Field of Search .......................... 53/53–55, 65, 53/77, 151, 234, 494; 700/9, 117, 213, 229

(56) References Cited

U.S. PATENT DOCUMENTS

| | | | |
|---|---|---|---|
| 3,828,668 A | * | 8/1974 | Zugcic .......................... 101/40 |
| 3,924,386 A | * | 12/1975 | Schmermund ................ 53/234 |
| RE28,813 E | * | 5/1976 | Davies et al. .................... 53/53 |
| 3,956,870 A | * | 5/1976 | Kruse et al. ..................... 53/55 |
| 4,330,976 A | | 5/1982 | Blackall et al. |
| 4,408,295 A | * | 10/1983 | Kavage et al. .............. 700/213 |
| 4,441,302 A | * | 4/1984 | Gabbitas et al. ................ 700/9 |
| 4,607,477 A | * | 8/1986 | Hinchcliffe et al. ............ 53/54 |
| 4,691,496 A | * | 9/1987 | Anderson et al. ............... 53/53 |
| 4,866,912 A | | 9/1989 | Deutsch |
| 5,249,416 A | * | 10/1993 | Adams et al. ................ 53/234 |
| 5,678,385 A | * | 10/1997 | Focke et al. .................. 53/151 |
| 6,035,603 A | * | 3/2000 | Focke et al. .................... 53/55 |
| 6,038,832 A | * | 3/2000 | Focke et al. .................... 53/53 |

FOREIGN PATENT DOCUMENTS

| EP | 0 927 684 A | 7/1999 |
|---|---|---|
| GB | 2 220 911 A | 1/1990 |

* cited by examiner

*Primary Examiner*—Stephen F. Gerrity
(74) *Attorney, Agent, or Firm*—Marshall, Gerstein & Borun LLP

(57) ABSTRACT

A machine for producing packets of cigarettes, each packet having a group of cigarettes enclosed in packaging material, has a number of conveyors, each having a respective given number of respective members which are brought into contact with the groups and/or the packaging material, and cooperate with the members of at least one adjacent conveyor; the number of members of each conveyor being equal to a multiple or to a divisor of the number of members of an adjacent conveyor.

23 Claims, 2 Drawing Sheets

MACHINE FOR PRODUCING PACKETS OF CIGARETTES, WHEREIN THE NUMBER OF MEMBERS OF EACH CONVEYOR IS COORDINATED WITH THE NUMBER OF MEMBERS OF THE ADJACENT CONVEYORS

The present invention relates to a machine for producing packets of cigarettes.

BACKGROUND OF THE INVENTION

A packet of cigarettes comprises a group of cigarettes, and packaging material folded about the group; and machines for producing packets of cigarettes comprise a number of conveyors, each having a given number of members arranged in series and for manipulating the groups and/or the packaging material and for performing the operations by which the packets are produced. The members of each conveyor also cooperate with those of adjacent conveyors to transfer the groups and/or the packaging material— unfolded, partly folded, or folded into the form of the packet—from one conveyor to another. The number of members of each conveyor is normally determined on the basis of design parameters, which fail to take into account the adjustments required by the members of each conveyor, and the control methods implemented on the machine itself.

As a result, known machines of the above type for producing packets of cigarettes involve a painstaking setup procedure to adjust each member to cooperate effectively with all the members on the adjacent conveyor, and which must be repeated whenever the size of the packet is changed, thus resulting in prolonged stoppage of the machine.

SUMMARY OF THE INVENTION

It is an object of the present invention to provide a machine for producing packets of cigarettes, designed to eliminate the drawbacks of the known state of the art.

According to the present invention, there is provided a machine for producing packets of cigarettes; each packet comprising a group of cigarettes enclosed in packaging material; the machine comprising a number of conveyors, each having a respective number, greater than one, of members which are brought into contact with said groups and/or the packaging material, and cooperate with the members of at least one adjacent conveyor; in particular, said members comprising outlets for the groups, pockets for conveying the groups and/or packets, conveying heads for conveying the packaging material, and folding devices for folding said packaging material; and the machine being characterized in that the number of members of each conveyor is equal to a multiple or to a common divisor of the number of members of an adjacent conveyor.

The present invention also relates to a method of controlling a machine for producing packets of cigarettes.

According to the present invention, there is provided a method of controlling a machine, characterized by comprising the steps of extracting a given number of packets from said machine; and determining, for each extracted packet, which members have been brought into contact with the group and with the packaging material used to produce each extracted packet.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
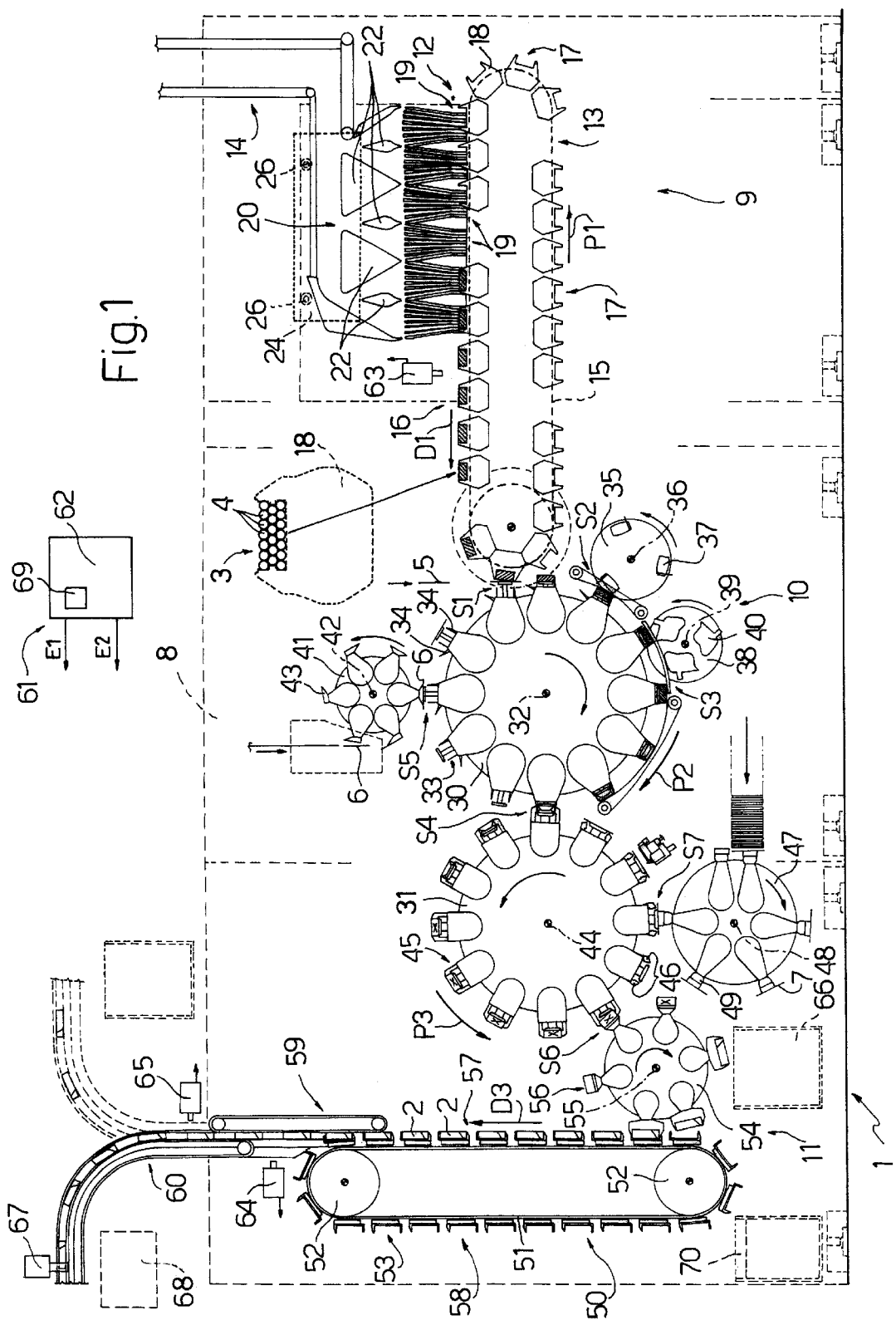
FIG. 1 shows a side view, with parts removed for clarity, of a machine in accordance with the present invention.

Number 1 in FIG. 1 indicates as a whole a machine for producing hinged-lid packets 2 of cigarettes.

Each packet 2 comprises an orderly group 3 of cigarettes 4 wrapped in a sheet of packaging material 5; a collar 6 about group 3 and on top of the sheet of packaging material 5; and a blank 7 folded about group 3.

Machine 1 comprises a frame 8, shown by the dash line in FIG. 1, which supports a device 9 for forming groups 3, a packaging device 10, and a device 11 for unloading the finished packets 2. Device 9 for forming groups 3 comprises a hopper 12 for conveying cigarettes 4; a pocket conveyor 13 for feeding groups 3 of cigarettes in a substantially horizontal direction D1; and a conveyor 14 for feeding cigarettes 4 in bulk to hopper 12. Conveyor 13 is a magnetic conveyor comprising an annular track 15, in turn, comprising a straight top branch 16 and along which four trains 17 of pockets 18 travel along an annular path P1. Each train 17 comprises six pockets 18, one of which is shown by the dash line in the enlarged detail in FIG. 1; hopper 12 comprises six outlets 19 arranged along top branch 16, and an inlet 20 communicating with conveyor 14; and cigarettes 4 extend crosswise to direction D1.

Figure 2:
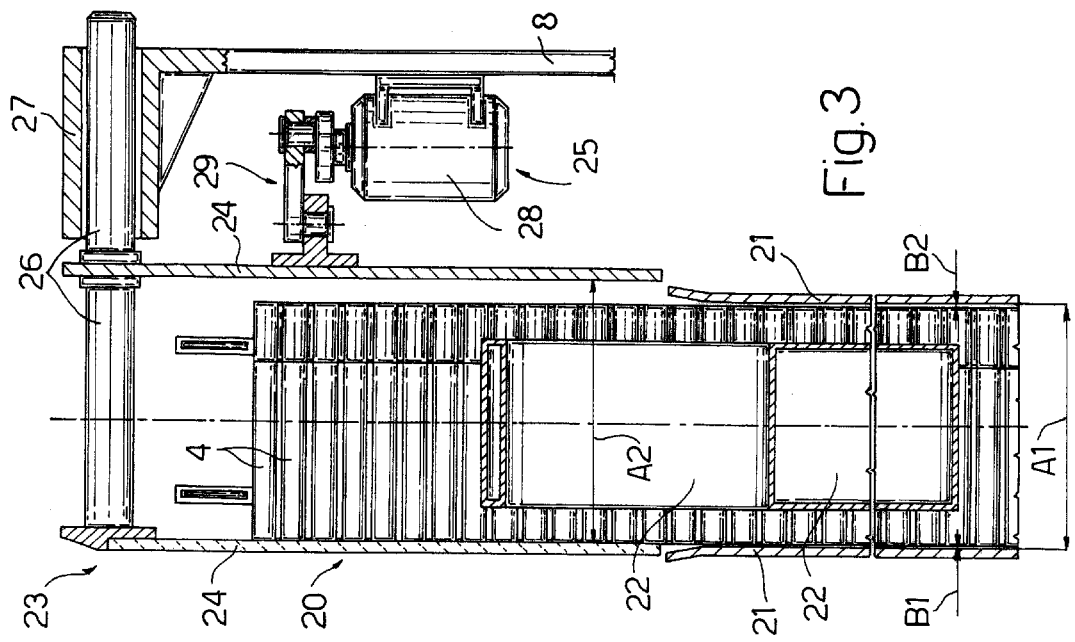
FIGS. 2 and 3 show sections of a detail of the FIG. 1 machine in a first and second operating position respectively.
Figure 3:
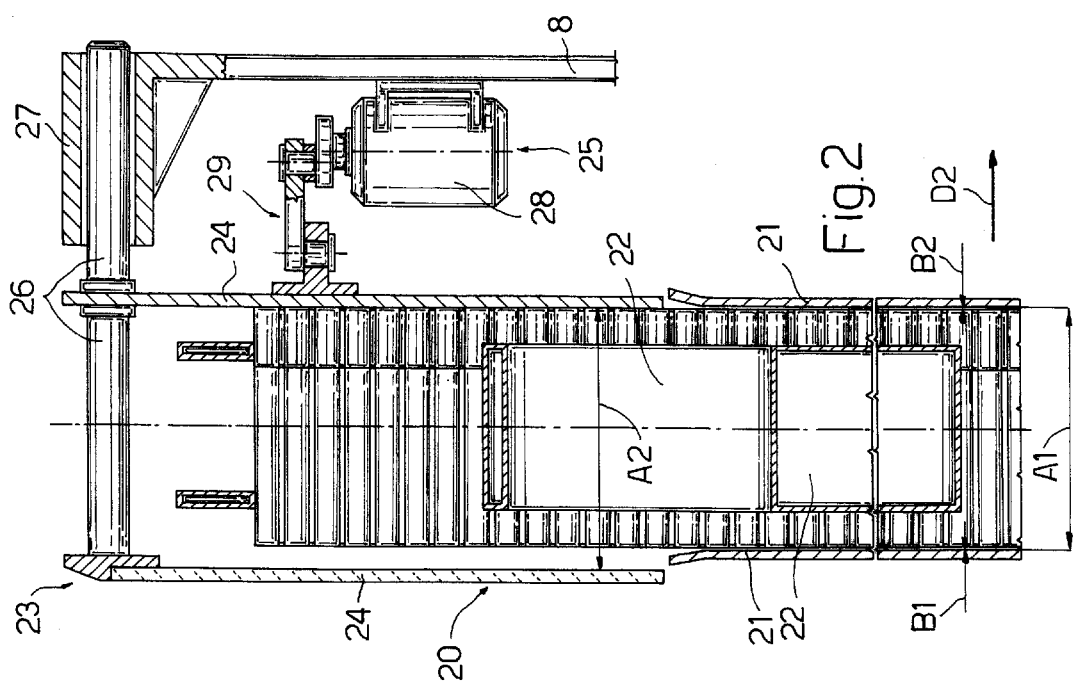

With reference to FIGS. 2 and 3, hopper 12 comprises two parallel, facing walls 21; and partitions 22 located between walls 21 to divide the stream of cigarettes 4 inside hopper 12. Walls 21 are vertical, are parallel to direction D1, and are located a fixed distance A1 apart in a horizontal direction D2 perpendicular to direction D1 and to walls 21. At inlet 20, an ordering device 23 is provided to align cigarettes 4, and comprises two walls 24 parallel to each other and to walls 21, and an actuator 25 for transmitting a back and forth movement to walls 24 in direction D2. Walls 24 are located a given distance A2 apart in direction D2, and are supported by pins 26 parallel to direction D2 and having respective appendixes engaged in respective guides 27 integral with frame 8. Actuator 25 comprises a motor 28, and a crank mechanism 29 connecting motor 28 to one of walls 24. Distance A1 equals the length of cigarettes 4 plus clearances B1 and B2 at opposite ends of each cigarette 4, and distance A2 is greater than distance A1. At each outlet 19, device 9 comprises a respective extractor (not shown) movable back and forth in direction D2 and controlled by a respective linear electric motor (not shown) to cyclically expel a group 3 from outlet 19.

With reference to FIG. 1, packaging device 10 comprises a packaging wheel 30, along which each group 3 is wrapped in a respective sheet 5 and partly enclosed in a respective collar 6; and a packaging wheel 31, along which each group 3 is enclosed in a blank 7. Wheel 30 rotates about an axis 32, and comprises twelve pockets 33, which are equally spaced about axis 32, house respective groups 3, and have respective movable folding walls 34. Each pocket 33 travels along an annular path P2, along which are located in succession a station S1 for supplying groups 3 and sheets 5; a station S2 for folding sheet 5; a further station S3 for folding sheet 5; a station S4 for transferring groups 3 onto wheel 31; and a station S5 for supplying collars 6. At station S2, there is provided a folding wheel 35 rotating about a respective axis 36, and comprising three folding tools 37 equally spaced about axis 36 and cooperating with the groups 3 conveyed by pockets 33 to fold sheet 5. Similarly, at station S3, there is provided a folding wheel 38 rotating about an axis 39, and comprising three folding tools 40 equally spaced about axis 39 and cooperating with the groups 3 conveyed by pockets 33 to fold sheet 5; and, at station S5, there is provided a wheel 41 rotating about an axis 42 parallel to axis 32, and comprising six pickup heads 43 equally spaced about axis 42 and for feeding collars 6 to pockets 33.

Wheel 31 rotates about an axis 44 parallel to axis 32, and comprises twelve pockets 45, which are equally spaced about axis 44, have respective movable walls 46, and are fed along a path P3, along which are located transfer station S4 for receiving groups 3 from wheel 30, a station S6 for transferring packets 2, and a station S7 for supplying blanks 7. At station S7, there is provided a wheel 47 rotating about an axis 48 parallel to axis 32, and comprising six heads 49 equally spaced about axis 48 and for feeding blanks 7 to pockets 45.

Unloading device 11 comprises a conveyor 50, which, in turn, comprises a chain 51 looped about two pulleys 52, extends in a vertical direction D3, and comprises twenty-four pockets 53 equally spaced along chain 51 and each for selectively retaining a respective packet 2 by means of a known actuator not shown. Conveyor 50 is supplied by a wheel 54, which rotates about an axis 55 parallel to axis 32, comprises six pockets 56, and is located between station S6 and conveyor 50 to transfer packets 2 from wheel 31 to conveyor 50, which comprises a straight upflow branch 57, along which packets 2 are fed in direction D3, and a downflow branch 58 parallel to branch 57. Unloading device 11 also comprises two suction-belt conveyors 59 and 60. Conveyor 59 has a portion located along upflow branch 57 to receive packets 2 from conveyor 50 and continue feeding packets 2 in direction D3, and is further connected to suction-belt conveyor 60 facing a portion of conveyor 59. In other words, conveyor 59 retains each packet 2 by suction on one face of packet 2, while conveyor 60 retains packet 2 by suction on the opposite face of packet 2.

Machine 1 comprises a control device 61 for checking groups 3 are complete, cigarettes 4 are undamaged, and packets 2 are formed properly. Control device 61 comprises a control unit 62; a camera 63 located along branch 16 to check groups 3 are complete and cigarettes 4 undamaged; and two cameras 64 and 65 facing conveyors 59 and 60 respectively, to check correct formation of packets 2 from two opposite angles. Control unit 62 is connected to wheel 54 to release packets 2 from wheel 54 into a bin 66, shown by the dash line in FIG. 1, and is connected to conveyor 60 to activate an extractor 67 for extracting packets 2 from conveyor 60 and feeding packets 2 into a bin 68 shown by the dash line in FIG. 1. Unit 62 emits an error signal E1 as a function of the values detected by camera 63, and uses error signal E1 to reject any packets 2 containing incomplete groups 3 or faulty cigarettes 4, and to activate pockets 56 of wheel 54 to feed such packets 2 into bin 66. Similarly, unit 62 emits an error signal E2 as a function of the values detected by cameras 64 and 65, to reject any packets 2 with flawed outer surfaces by means of extractor 67.

Unit 62 comprises a control member 69 for disabling transfer of packets 2 from conveyor 50 to conveyor 59, so that packets 2 are fed along downflow branch 58 of conveyor 50 and released successively onto a table 70 shown by the dash line in FIG. 1.

Each outlet 19 has a respective identification mark to distinguish it from the other outlets 19. And similarly, each of pockets 18, 33, 45, 53 and 56, each of pickup heads 43 and 49, and each of tools 37 and 40 have respective identification marks—normally numbers—so as to easily identifiable on machine 1.

In actual use, cigarettes 4 are fed in bulk to hopper 12 by conveyor 14, and are deposited between walls 24 of ordering device 23 at inlet 20 of hopper 12. Walls 24 are moved back and forth in direction D2 between the two positions shown in FIGS. 2 and 3 respectively, and are oscillated by an amount equal to "A2−A1+B1+B2", so that cigarettes 4 are aligned perfectly by device 23 before dropping down between walls 21 of hopper 12, and so that the ends of cigarettes 4 are prevented from sliding against walls 21.

Inside hopper 12, cigarettes 4 are fed by gravity to outlets 19, from which groups 3 are extracted as described previously. One group 3 is extracted from each outlet 19 and deposited inside a respective pocket 18 of a train 17 arrested at outlets 19. Conveyor 13 is operated to feed trains 17 continuously past wheel 30, and to stop at outlets 19 to receive groups 3 from outlets 19. Each pocket 18 of trains 17 cooperates with only one respective outlet 19 of hopper 12, and each train 17 is activated independently of the other trains 17.

The groups 3 fed by pockets 18 along branch 16 are controlled by camera 63 to ensure each group 3 is complete and cigarettes 4 undamaged. When the values detected by camera 63 depart from given threshold values, control unit 62 emits error signal E1 to expel the packet 2 containing an incomplete group 3 or faulty cigarette, as the packet 2 is fed by wheel 54 past bin 66. That is, control unit 62 provides for expelling the faulty packet 2 from pocket 56 in known manner.

Groups 3 are transferred successively from conveyor 13 onto wheel 30 at station S1, and are transferred between pockets 18 and pockets 33 so that each pocket 18 transfers a group 3 to a respective pocket 33 on wheel 30. That is, at each cycle, each pocket 18 of each train 17 always cooperates with the same pocket 33 on wheel 30. At station S1, each pocket 33 is supplied with a sheet 5 of packaging material, which is wrapped about group 3 along path P2; and, at station S5, each pocket 33 is supplied with a respective collar 6, which is folded about group 3 and on top of packaging material 5.

Collar 6 and part of sheet 5 of packaging material are folded by the movable folding walls 34 of each pocket 33, and the folding of sheet 5 of packaging material is completed by wheels 35 and 38. Collars 6 are supplied to pockets 33 by heads 43, so that each of the six heads 43 only cooperates with two of the twelve pockets 33. Similarly, each folding tool 37 and 40 of respective wheels 35 and 38 only cooperates with a given four of the twelve pockets 33.

At station S4, each group 3, complete with a respective folded sheet 5 and with a respective folded collar 6, is transferred onto wheel 31. In this case, since pockets 33 are equal in number to pockets 45, each given pocket 33 only cooperates with a given pocket 45. At station S7, each pocket 45 is supplied with a blank 7 by a head 49 on wheel 47, and each head 49 only cooperates with two pockets 45 on wheel 31. At station S6, packets 2 are transferred to pockets 56 on wheel 54, which in turn transfers packets 2 to pockets 53 on conveyor 50. Each pocket 56 only cooperates with two pockets 45 on wheel 31, and with four pockets 53 on conveyor 50. Packets 2 are then fed along upflow branch 57 of conveyor 50, are engaged by conveyor 59, are released to conveyor 59 by pockets 53, and are fed successively by conveyor 59 past camera 64. Conveyor 59 then releases packets 2 to conveyor 60, which feeds packets 2 successively past camera 65. When the images picked up by cameras 64 and 65 fail to fall within given threshold values, unit 62 emits error signal E2 to activate extractor 67, which feeds packets 2 into bin 68.

When control member 69 is activated, twelve successive, adjacent pockets 53 are disabled from releasing respective packets 2 to conveyor 59; the respective packets 2 are fed along downflow branch 58; and the disabled pockets 53 are activated to release packets 2 successively onto table 70 for inspection. The packets 2 collected on table 70 are numbered according to the sequence in which they are released.

Inspection consists in taking packets 2 apart to determine whether the group 3 forming, packaging and conveying operations on machine 1 have been performed properly, i.e. without damaging group 3, blank 7, collar 6, or sheet 5. Control unit 62 is able to identify the pocket 53 on conveyor 50 from which a given packet 2 has been extracted for inspection, and, on the basis of the structure of the machine, supplies the identification mark of the pocket 56 by which the packet 2 was conveyed; the identification mark of the pocket 45 by which blank 7 was folded to form the packet 2; the identification marks of pockets 18 and 33 by which the group 3 in the packet 2 was conveyed; the identification marks of heads 43 and 49 by which collar 6 and blank 7 were supplied to form the packet 2; and the identification numbers of tools 37 and 40 by which sheet 5 of the packet 2 was folded.

That is, by inspecting and detecting a flaw in a packet 2, it is possible to work out immediately which machine 1 member 18, 19, 33, 45, 37, 40, 43, 49, 53, 56 is responsible, and to change, repair or adjust the member 18, 19, 33, 45, 37, 40, 43, 49, 53, 56 in question. In other words, for each packet extracted, control unit 62 processes a predetermined algorithm relative to the relationships between the numbers of members 18, 19, 33, 45, 37, 40, 43, 49, 53, 56, in which the input data item is represented by the identification mark of the pocket 53 from which the packet 2 was extracted, and the variables are defined by the identification marks of members 18, 19, 33, 45, 37, 40, 43, 49, 56. The algorithm comprises a number of equations, which comprises the relationships between the numbers of members 18, 19, 33, 45, 37, 40, 43, 49, 53, 56 of adjacent conveyors 12, 13, 30, 31, 35, 38, 41, 47, 50, 54.

For example, on machine 1, given relationships exist between the numbers of members 18, 19, 33, 45, 37, 40, 43, 49, 53, 56, and which are determined by machine 1 comprising three tools 37 and three tools 40, six outlets 19, six heads 43, six heads 49 and six pockets 56, twelve pockets 33 and twelve pockets 45, twenty-four pockets 18 and twenty-four pockets 53. In the case of machine 1 described, said numbers form part of a geometric progression of ratio 2.

In the example described, control unit 62 provides for extracting twelve packets 2, but may control the number of packets 2 to be extracted, which should advisably form part of said geometric progression. For example, extracting three packets 2 provides for a complete check of three tools 37 and three tools 40; extracting six packets 2 provides for a complete check of pockets 56, heads 43 and 49, and outlets 19; extracting twelve packets 2 provides for a complete check of twelve pockets 45 and twelve pockets 33; and extracting twenty-four packets provides for a complete check of twenty-four pockets 53 and twenty-four pockets 18.

What is claimed is:

1. A machine for producing packets of cigarettes, each packet (2) comprising a group (3) of cigarettes (4) enclosed in packaging material (5, 6, 7), the machine (1) comprising:

a number of conveyors (12, 13, 30, 31, 35, 38, 41, 47, 50, 54), each having a respective number, greater than one, of members (18, 19, 33, 45, 37, 40, 43, 49, 53, 56) which are brought into contact with said groups (3) and/or the packaging material (5, 6, 7), and cooperate with the members (18, 19, 33, 45, 37, 40, 43, 49, 53, 56) of at least one adjacent conveyor (12, 13, 30, 31, 35, 38, 41, 47, 50, 54);

the members (18, 19, 33, 45, 37, 40, 43, 49, 53, 56) comprising outlets (19) for the groups (3), pockets (18, 33, 45, 53, 56) for conveying the groups (3) and/or packets (2), conveying heads (43, 49) for conveying the packaging material (6, 7), and folding devices (37, 40) for folding said packaging material (5);

wherein the number of members (18, 19, 33, 45, 37, 40, 43, 49, 53, 56) of each conveyor (12, 13, 30, 31, 35, 38, 41, 47, 50, 54) is equal to a multiple or to a common divisor of the number of members (18, 19, 33, 45, 37, 40, 43, 49, 53, 56) of an adjacent conveyor (12, 13, 30, 31, 35, 38, 41, 47, 50, 54).

2. A machine as claimed in claim 1, wherein the number of members (18, 19, 33, 45, 37, 40, 43, 49, 53, 56) of each of the number of conveyors (12, 13, 30, 31, 35, 38, 41, 47, 50, 54) equals a given whole number or a multiple or a submultiple of the whole number.

3. A machine as claimed in claim 2, wherein said given whole number equals twelve.

4. A machine as claimed in claim 2, wherein the numbers of members (18, 19, 33, 45, 37, 40, 43, 49, 53, 56) of the conveyors (12, 13, 30, 31, 35, 38, 41, 47, 50, 54) of said machine (1) form part of a geometric progression of ratio two.

5. A machine as claimed in claim 1, wherein each member (18, 19, 33, 45, 37, 40, 43, 49, 53, 56) of each conveyor (12, 13, 30, 31, 35, 38, 41, 47, 50, 54) is identified by a respective identification mark with respect to the other members (18, 19, 33, 45, 37, 40, 43, 49, 53, 56) of the same conveyor (12, 13, 30, 31, 35, 38, 41, 47, 50, 54).

6. A machine as claimed in claim 5, wherein said conveyors (12, 13, 30, 31, 35, 38, 41, 47, 50, 54) comprise a hopper (12) for conveying said cigarettes (4); packaging wheels (30, 31); supply wheels (41, 47) for supplying said packaging material (6, 7); folding wheels (35, 38) for folding the packaging material (5); a first pocket conveyor (13) for conveying said groups (3); and a second and a third pocket conveyor (54, 50) for conveying said packets (2).

7. A machine as claimed in claim 6, further comprising a first and a second packaging wheel (30, 31) adjacent to each other; a first and a second folding wheel (35, 38) adjacent to the first packaging wheel (30); and a first and a second supply wheel (41, 47) adjacent to the first and the second packaging wheel (30, 31) respectively.

8. A machine as claimed in claim 7, wherein said members (18, 19, 33, 45, 37, 40, 43, 49, 53, 56) comprise six outlets (19) for the groups (3) of cigarettes from the hopper (12); twelve first packaging pockets (33) of said first packaging wheel (30); twelve second packaging pockets (45) of the second packaging wheel (31); six first gripping heads (43) of the first supply wheel (41); six second gripping heads (49) of the second supply wheel (47); three first folding tools (37) of the first folding wheel (35); and three second folding tools (40) of the second folding wheel (38).

9. A machine as claimed in claim 7, wherein the first pocket conveyor (13) comprises twenty-four first conveying pockets (18) for conveying said groups (3);

said first conveying pockets (18) being arranged in four trains (17) of six pockets each; and each train (17) being movable independently of the other trains (17).

10. A machine as claimed in claim 9, wherein said second pocket conveyor (54) comprises six second conveying pockets (56) for conveying the packets (2); and the third pocket conveyor (50) comprises twenty-four third conveying pockets (53) for conveying said packets (2).

11. A machine as claimed in claim 6, wherein said hopper (12) comprises an inlet (20) for the cigarettes and an ordering device (23) located at said inlet (20) to position the ends of the cigarettes in the same plane.

12. A machine as claimed in claim 11, wherein said ordering device (23) comprises two facing parallel walls (24) movable back and forth in a given direction (D2) perpendicular to the walls (24).

13. A machine as claimed in claim 12, wherein said walls (24) are located a first distance (A2) apart, said first distance (A2) being greater than the length of the cigarettes.

14. A machine as claimed in claim 13, wherein said hopper comprises two fixed walls (21) parallel to said walls (24), said fixed walls (21) being located a second distance (A1) apart.

15. A machine as claimed in claim 5, further comprising a control device (61) in turn comprising a control unit (62) connected to at least one of said conveyors (12, 13, 30, 31, 35, 38, 41, 47, 50, 54).

16. A machine as claimed in claim 15, wherein said control unit (62) comprises a control member (69) for extracting a given number of packets (2) from a given conveyor (50) for the purpose of inspecting said packets (2).

17. A machine as claimed in claim 15, wherein said control device (61) comprises optoelectronic means (63, 64, 65) for controlling the groups (3) and the packets (2), said optoelectronic means (63, 64, 65) being connected to said control unit (62), which emits error signals (E1, E2) for rejecting the packets (2).

18. A machine for producing packets of cigarettes, each packet (2) comprising a group (3) of cigarettes (4) enclosed in packaging material (5, 6, 7), the machine (1) comprising:

a number of conveyors (12, 13, 30, 31, 35, 38, 41, 47, 50, 54), each having a respective number, greater than one, of members (18, 19, 33, 45, 37, 40, 43, 49, 53, 56) which are brought into contact with said groups (3) and/or the packaging material (5, 6, 7), and cooperate with the members (18, 19, 33, 45, 37, 40, 43, 49, 53, 56) of at least one adjacent conveyor (12, 13, 30, 31, 35, 38, 41, 47, 50, 54);

said members (18, 19, 33, 45, 37, 40, 43, 49, 53, 56) comprising outlets (19) for the groups (3), pockets (18, 33, 45, 53, 56) for conveying the groups (3) and/or packets (2), conveying heads (43, 49) for conveying the packaging material (6, 7), and folding devices (37, 40) for folding said packaging material (5);

the number of members (18, 19, 33, 45, 37, 40, 43, 49, 53, 56) of each conveyor (12, 13, 30, 31, 35, 38, 41, 47, 50, 54) being equal to a multiple or to a common divisor of the number of members (18, 19, 33, 45, 37, 40, 43, 49, 53, 56) of an adjacent conveyor (12, 13, 30, 31, 35, 38, 41, 47, 50, 54);

the number of members (18, 19, 33, 45, 37, 40, 43, 49, 53, 56) of each conveyor (12, 13, 30, 31, 35, 38, 41, 47, 50, 54) equaling a given whole number or a multiple or a submultiple of the whole number; and the numbers of members (18, 19, 33, 45, 37, 40, 43, 49, 53, 56) of the conveyors (12, 13, 30, 31, 35, 38, 41, 47, 50, 54) of said machine (1) forming part of a geometric progression ratio of two.

19. A machine for producing packets of cigarettes, each packet (2) comprising a group (3) of cigarettes (4) enclosed in packaging material (5, 6, 7), the machine (1) comprising:

a number of conveyors (12, 13, 30, 31, 35, 38, 41, 47, 50, 54), each having a respective number, greater than one, of members (18, 19, 33, 45, 37, 40, 43, 49, 53, 56) which are brought into contact with said groups (3) and/or the packaging material (5, 6, 7), and cooperate with the members (18, 19, 33, 45, 37, 40, 43, 49, 53, 56) of at least one adjacent conveyor (12, 13, 30, 31, 35, 38, 41, 47, 50, 54);

said members (18, 19, 33, 45, 37, 40, 43, 49, 53, 56) comprising outlets (19) for the groups (3), pockets (18, 33, 45, 53, 56) for conveying the groups (3) and/or packets (2), conveying heads (43, 49) for conveying the packaging material (6, 7), and folding devices (37, 40) for folding said packaging material (5);

the number of members (18, 19, 33, 45, 37, 40, 43, 49, 53, 56) of each conveyor (12, 13, 30, 31, 35, 38, 41, 47, 50, 54) being equal to a multiple or to a common divisor of the number of members (18, 19, 33, 45, 37, 40, 43, 49, 53, 56) of an adjacent conveyor (12, 13, 30, 31, 35, 38, 41, 47, 50, 54);

each member (18, 19, 33, 45, 37, 40, 43, 49, 53, 56) of each conveyor (12, 13, 30, 31, 35, 38, 41, 47, 50, 54) being identified by a respective identification mark with respect to the other members (18, 19, 33, 45, 37, 40, 43, 49, 53, 56) of the same conveyor (12, 13, 30, 31, 35, 38, 41, 47, 50, 54).

20. A machine for producing packets of cigarettes, each packet (2) comprising a group (3) of cigarettes (4) enclosed in packaging material (5, 6, 7), the machine (1) comprising:

a plurality of group conveyors (13, 30, 31, 50, 54) disposed along a production line, each group conveyor being disposed adjacent to each other, each group conveyor having a respective plurality of pockets (18, 33, 45, 53, 56) which receive at least the groups (3) at a first station, and transfer the received groups to the pockets (18, 19, 33, 45, 53, 56) of an adjacent conveyor (13, 30, 31, 50, 54) at a second station;

wherein the number of pockets (18, 33, 45, 53, 56) of each group conveyor (13, 30, 31, 50, 54) is equal to a multiple or to a common divisor of the number of pockets (18, 33, 45, 53, 56) of adjacent conveyor (13, 30, 31, 50, 54), such that each of the pockets of either the group conveyor or its adjacent conveyor interacts with only one of the pockets of the other of the group conveyor or its adjacent conveyor, wherein if an unacceptable packet is produced, the individual pocket of a specific conveyor causing the error can be identified.

21. The machine of claim 20, further comprising at least one packaging conveyor, disposed adjacent at least one group conveyor, each packaging conveyor including a plurality of heads adapted to receive packaging material at a first station, and to transfer the packaging material to the pockets of a group conveyor at a second station.

22. The machine of claim 21, further comprising a hopper with a plurality of outlets adapted to dispense groups of cigarettes into the conveying heads, wherein the number of outlets is equal to a multiple or to a common divisor of the number of conveying heads of an adjacent conveyor.

23. The machine of claim 22, further comprising at least one folding wheel disposed adjacent at least one conveyor, each folding wheel including a plurality of folding tools configured to fold a portion of the packing material, wherein the number of folding tools is equal to a multiple or to a common divisor of the number of conveying heads of an adjacent conveyor.

* * * * *

UNITED STATES PATENT AND TRADEMARK OFFICE
CERTIFICATE OF CORRECTION

PATENT NO. : 6,698,158 B2
DATED : March 2, 2004
INVENTOR(S) : Mario Spatafora

It is certified that error appears in the above-identified patent and that said Letters Patent is hereby corrected as shown below:

Column 7,
Line 23, "19, .33" should be -- 19, 33 --

Signed and Sealed this

Twenty-ninth Day of June, 2004

JON W. DUDAS
*Acting Director of the United States Patent and Trademark Office*